US010522805B2

(12) United States Patent
Cho

(10) Patent No.: US 10,522,805 B2
(45) Date of Patent: Dec. 31, 2019

(54) BATTERY PACK

(71) Applicant: SAMSUNG SDI CO., LTD., Yongin-si, Gyeonggi-do (KR)

(72) Inventor: Su Sang Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 239 days.

(21) Appl. No.: 15/619,807

(22) Filed: Jun. 12, 2017

(65) Prior Publication Data

US 2018/0097213 A1 Apr. 5, 2018

(30) Foreign Application Priority Data

Sep. 30, 2016 (KR) ........................ 10-2016-0127139

(51) Int. Cl.
*H01M 2/10* (2006.01)
*H01M 2/20* (2006.01)

(52) U.S. Cl.
CPC ....... *H01M 2/1094* (2013.01); *H01M 2/1077* (2013.01); *H01M 2/20* (2013.01); *H01M 2/206* (2013.01); *H01M 2220/20* (2013.01)

(58) Field of Classification Search
CPC .... H01M 2/1077; H01M 2/1094; H01M 2/20; H01M 2/206; H01M 2220/20; H01M 2/24
See application file for complete search history.

(56) References Cited

U.S. PATENT DOCUMENTS

| | | | | |
|---|---|---|---|---|
| 6,326,103 B1 * | 12/2001 | Ido | ........................ | H01M 2/024 429/148 |
| 2004/0197647 A1 * | 10/2004 | Murashige | ............ | H01M 2/266 429/185 |
| 2006/0275658 A1 * | 12/2006 | Sanada | .................... | H01M 2/08 429/185 |
| 2009/0323293 A1 * | 12/2009 | Koetting | ............. | H01M 10/425 361/736 |
| 2010/0112424 A1 * | 5/2010 | Hayashi | ............... | H01M 2/1077 429/99 |
| 2010/0316906 A1 | 12/2010 | Nansaka et al. | | |
| 2012/0009455 A1 * | 1/2012 | Yoon | ................... | H01M 10/653 429/120 |
| 2012/0196166 A1 * | 8/2012 | Kim | ...................... | H01M 2/206 429/94 |
| 2012/0328908 A1 | 12/2012 | Han et al. | | |
| 2013/0252047 A1 * | 9/2013 | Park | .................... | H01M 2/1077 429/90 |
| 2015/0099147 A1 | 4/2015 | Kong et al. | | |
| 2015/0174455 A1 * | 6/2015 | Isogawa | ............. | A63B 37/0044 473/376 |
| 2017/0047614 A1 * | 2/2017 | Sakai | ...................... | H01M 2/08 |

FOREIGN PATENT DOCUMENTS

| | | |
|---|---|---|
| JP | 2010-0287408 A | 12/2010 |
| KR | 2010-0025968 A | 3/2010 |
| KR | 2013-0023059 A | 3/2013 |
| KR | 2014-0013273 A | 2/2014 |
| WO | WO 2015/166812 | * 11/2015 |

* cited by examiner

*Primary Examiner* — Anca Eoff

(74) *Attorney, Agent, or Firm* — Lewis Roca Rothgerber Christie LLP

(57) ABSTRACT

A battery pack includes: a core pack comprising a battery cell including a plurality of unit battery cells electrically connected to each other, a first electrode tab, and a second electrode tab; a case comprising a lower case accommodating the core pack therein and having an opening at a side thereof to insert the core pack therethrough, and an upper case closing the opening and including a first terminal and a second terminal electrically connected to the first electrode tab and the second electrode tab, respectively; and an elastic body between the core pack and the case to elastically support an exterior of the core pack.

13 Claims, 6 Drawing Sheets

BATTERY PACK

CROSS-REFERENCE TO RELATED APPLICATION

This application claims priority to and the benefit of Korean Patent Application No. 10-2016-0127139, filed on Sep. 30, 2016 in the Korean Intellectual Property Office, the entire disclosure of which is incorporated herein by reference.

BACKGROUND

1. Field

Aspects of one or more embodiments relate to a battery pack.

2. Description of the Related Art

In general, unlike non-rechargeable primary batteries, secondary batteries are rechargeable. Such secondary batteries are used as energy sources in mobile devices, motorbikes, electric vehicles, hybrid electric vehicles, electric bicycles, uninterruptable power supplies, etc.

A small mobile device may use a small number of unit battery cells. On the other hand, a medium or large electronic device requires high output and high capacity and, thus, uses a battery pack including a large number of unit battery cells connected to each other. The battery pack may be divided into an inner battery pack and a hard battery pack depending on a type of case thereof. A battery cell is located in a case before the battery pack is assembled. A device that undergoes much vibration, e.g., a motorbike, includes a battery pack for ignition to start the engine, and the battery pack should be protected from accidents or external impacts.

SUMMARY

One or more embodiments include a battery pack having enhanced durability.

Additional aspects will be set forth, in part, in the description which follows and, in part, will be apparent from the description, or may be learned by practice of the presented embodiments.

According to one or more embodiments, a battery pack includes: a core pack comprising a battery cell including a plurality of unit battery cells electrically connected to each other, a first electrode tab, and a second electrode tab; a case comprising a lower case accommodating the core pack therein and having an opening at a side thereof to insert the core pack therethrough, and an upper case closing the opening and including a first terminal and a second terminal electrically connected to the first electrode tab and the second electrode tab, respectively; and an elastic body between the core pack and the case to elastically support an exterior of the core pack.

The unit battery cells may be sequentially arranged in a first direction, the battery cell may include a top part, a bottom part in a direction opposite to the top part, and side parts interconnecting the top and bottom parts, the first and second electrode tabs being arranged on the top part, and the elastic body may surround the side parts of the battery cell.

The elastic body may have a space accommodating the battery cell therein and may include first surfaces contacting the side parts of the battery cell, and second surfaces opposite to the first surfaces in a thickness direction and contacting internal side surfaces of the lower case.

The elastic body may have opening parts provided by cutting at least parts of the elastic body to provide swelling spaces for the battery cell.

The opening parts may correspond to regions where parts of the elastic body are open from a top edge of the elastic body corresponding to the top part of the battery cell toward a bottom edge of the elastic body corresponding to the bottom part of the battery cell.

Each of the opening parts may include a first opening t part and a second opening part extending from the top edge of the elastic body toward the bottom edge of the elastic body and spaced apart from each other, and a third opening part interconnecting the first and second opening parts.

The elastic body may further include an extension part provided between the bottom part of the battery cell and a bottom surface of the lower case, and bent and extended from a bottom part of the elastic body surrounding the side parts of the battery cell.

At least one release hole may be provided in the extension part to release heat generated from the battery cell.

A plurality of grooves may be provided in the second surfaces to reduce friction with the lower case.

The grooves may have linear shapes extending from a top edge of the elastic body corresponding to the top part of the battery cell to a bottom edge of the elastic body corresponding to the bottom part of the battery cell, and are spaced apart from each other in a second direction crossing the first direction.

A cell holder may be provided at a first side of the battery cell in a second direction crossing the first direction, to cover the first side of the battery cell.

A plurality of terminal plates each having one or more tab holes, and a first cell tab and a second cell tab protruding from each of the unit battery cells may be provided at a first side of the battery cell, and the first and second cell tabs having opposite polarities and protruding from neighboring unit battery cells may be respectively inserted and fixed into a first tab hole and a second tab hole of the one or more tab holes of a terminal plate of the plurality of terminal plates.

A first terminal plate of the plurality of terminal plates having a first tab hole of the one or more tab holes and a second terminal plate of the plurality of terminal plates having a second tab hole of the one or more tab holes may be separately provided at outermost parts of the battery cell, the first cell tab protruding from a unit battery cell of the unit battery cells may be connected through the first tab hole to the first terminal plate, the second cell tab protruding from another unit battery cell of the unit battery cells may be connected through the second tab hole to the second terminal plate, and the first and second terminal plates may be respectively electrically connected to the first and second electrode tabs provided at the top part of the battery cell.

The first electrode tab may be electrically connected to the first terminal through a first wire, and the second electrode tab may be electrically connected to the second terminal through a second wire.

BRIEF DESCRIPTION OF THE DRAWINGS

These and/or other aspects will become apparent and more readily appreciated from the following description of one or more embodiments, taken in conjunction with the accompanying drawings, in which.

DETAILED DESCRIPTION

Figure 1:
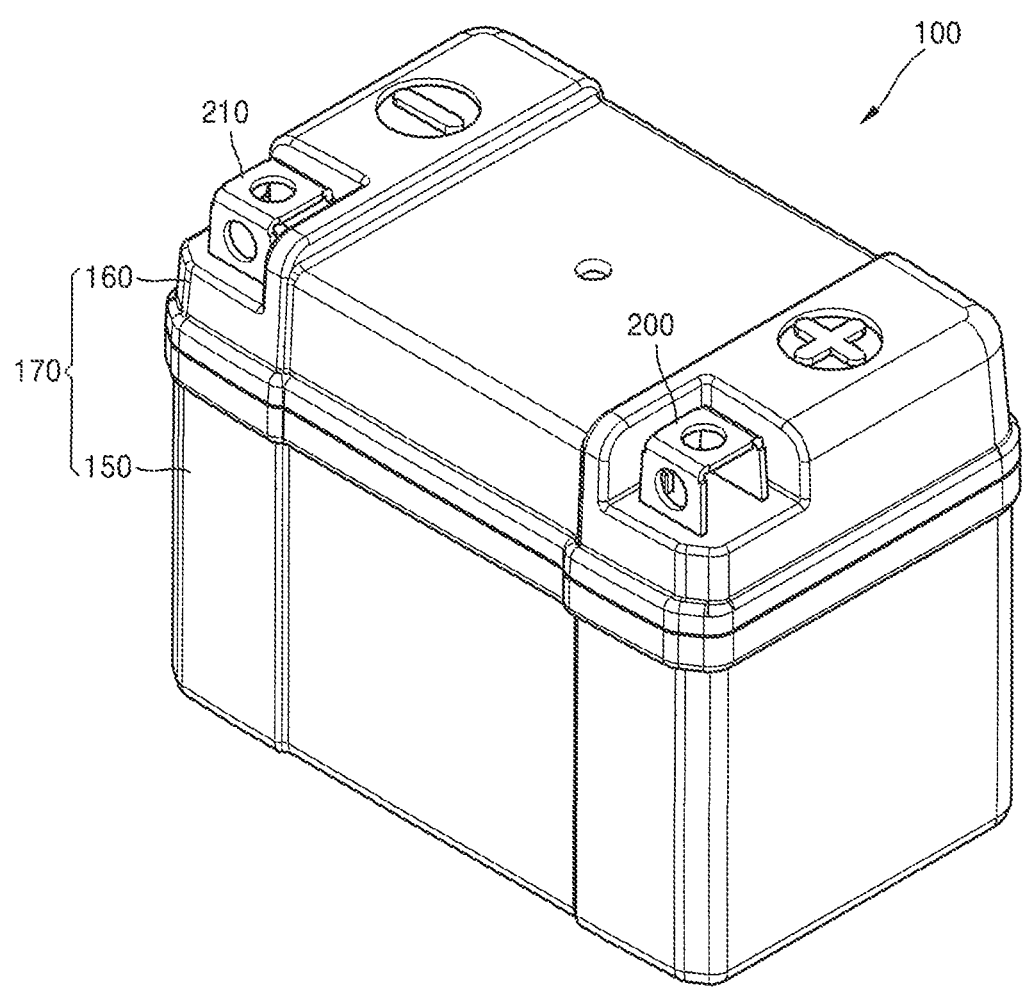
FIG. 1 is a perspective view of a battery pack according to an embodiment.

Reference will now be made in further detail to one or more embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the one or more embodiments.

It will be understood that when an element such as a layer, region, or plate is referred to as being "on" another element, it can be directly on the other element, or an intervening element may also be present. In the drawings, the sizes of elements may be exaggerated for convenience of explanation. For example, the sizes or thicknesses of elements in the drawings may be arbitrarily shown for convenience of explanation and, thus, the embodiments are not limited thereto.

In the following description, x, y, and z axes are not limited to three axes on an orthogonal coordinate system, and may be interpreted in a broader sense. For example, the x, y, and z axes may be orthogonal or non-orthogonal to each other.

Figure 2:
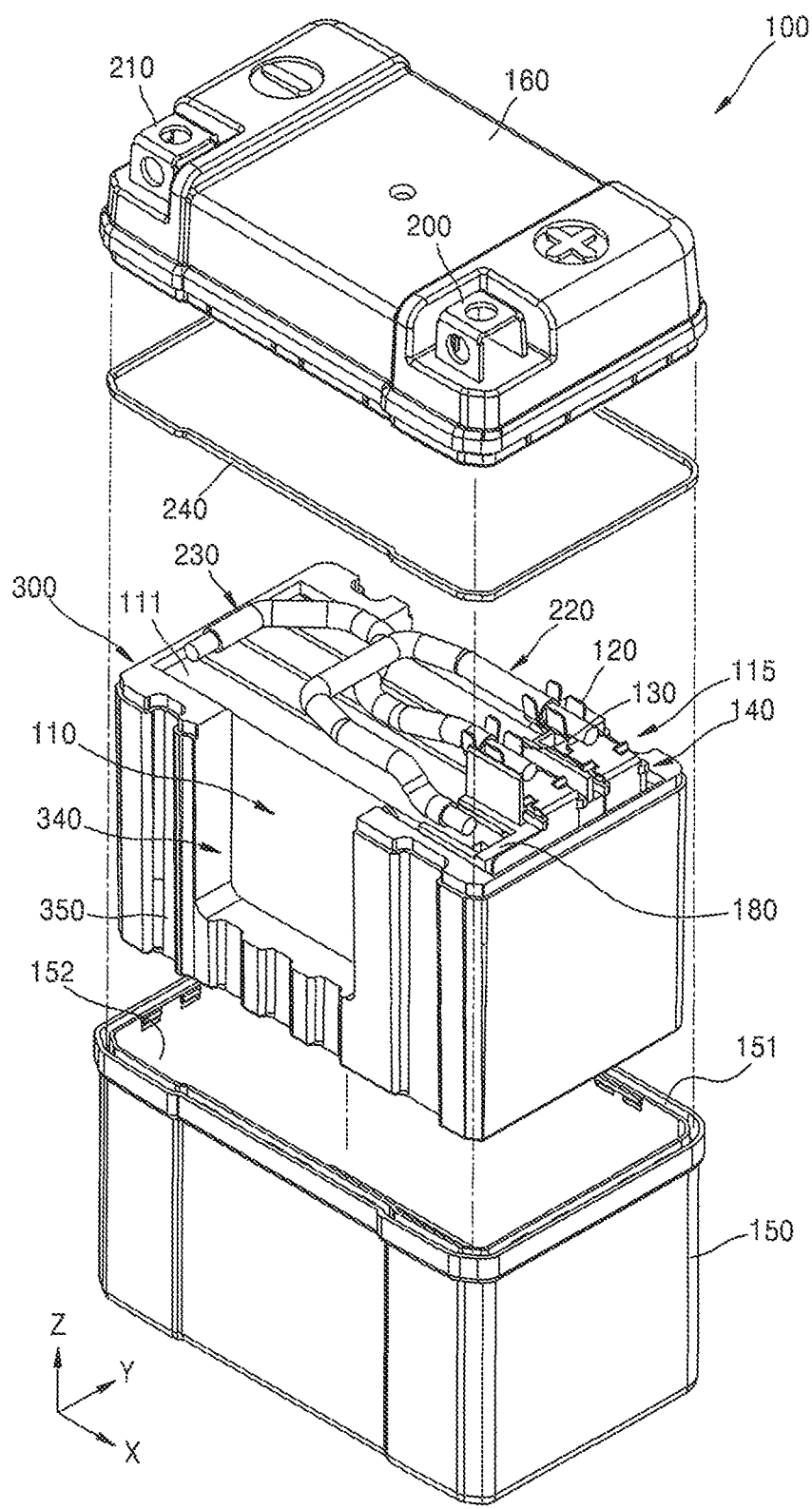
FIG. 2 is an exploded perspective view of the battery pack of FIG. 1.
Figure 3:
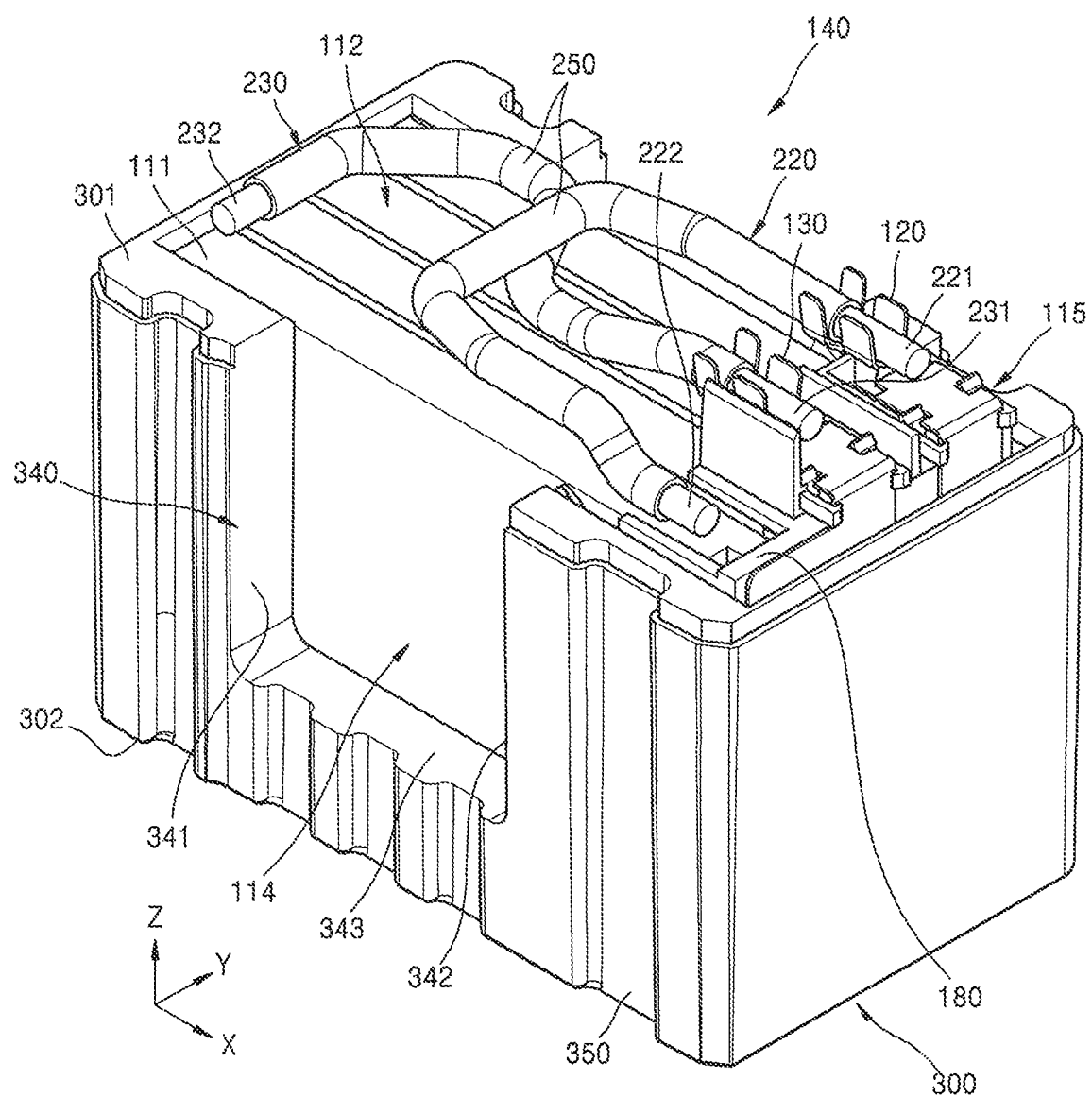
FIG. 3 is a perspective view of a core pack and an elastic body of the battery pack of FIG. 1.
Figure 4:
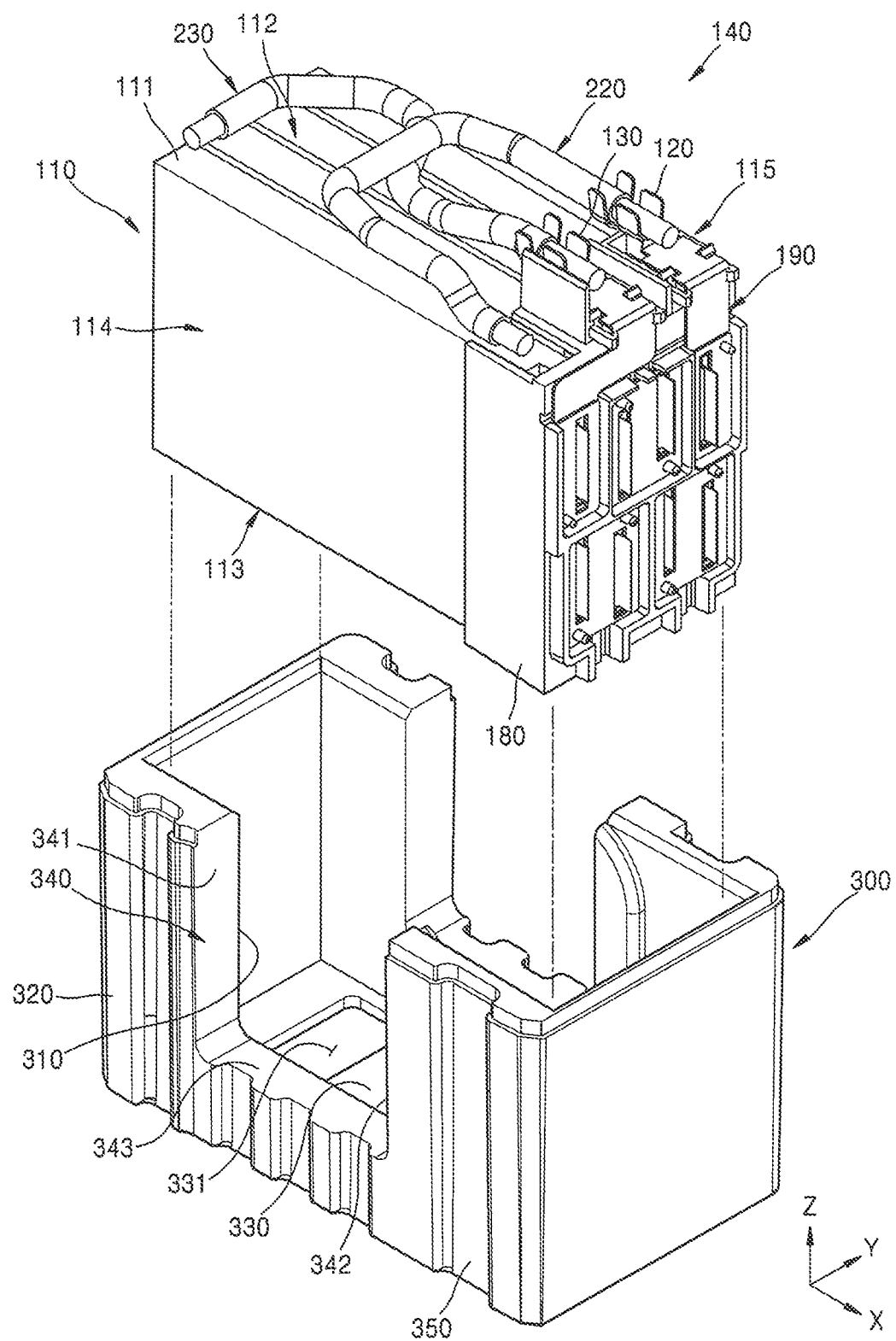
FIG. 4 is an exploded perspective view of the core pack and the elastic body of FIG. 3.
Figure 5:
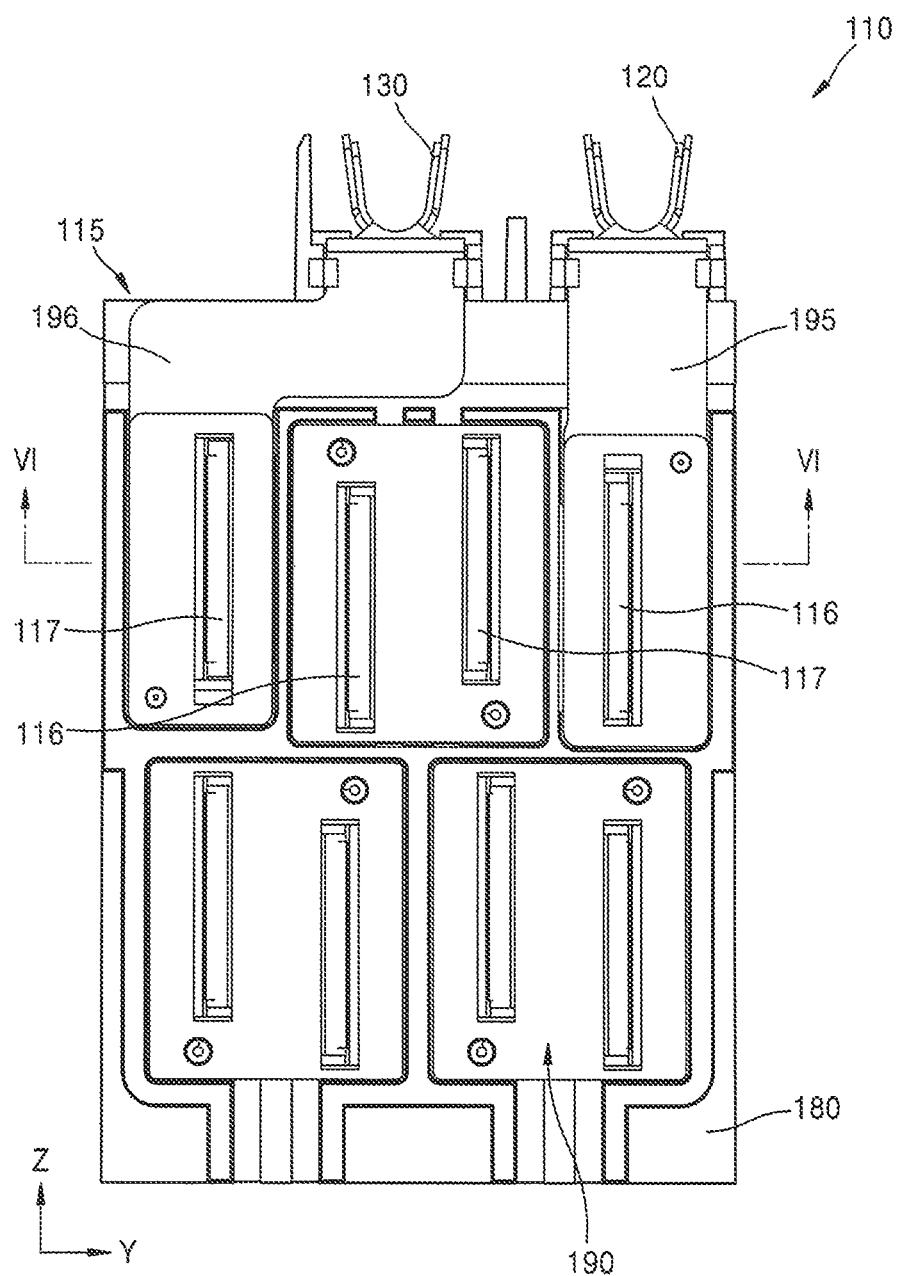
FIG. 5 is a side view of a first side of a battery cell of FIG. 2.
Figure 6:
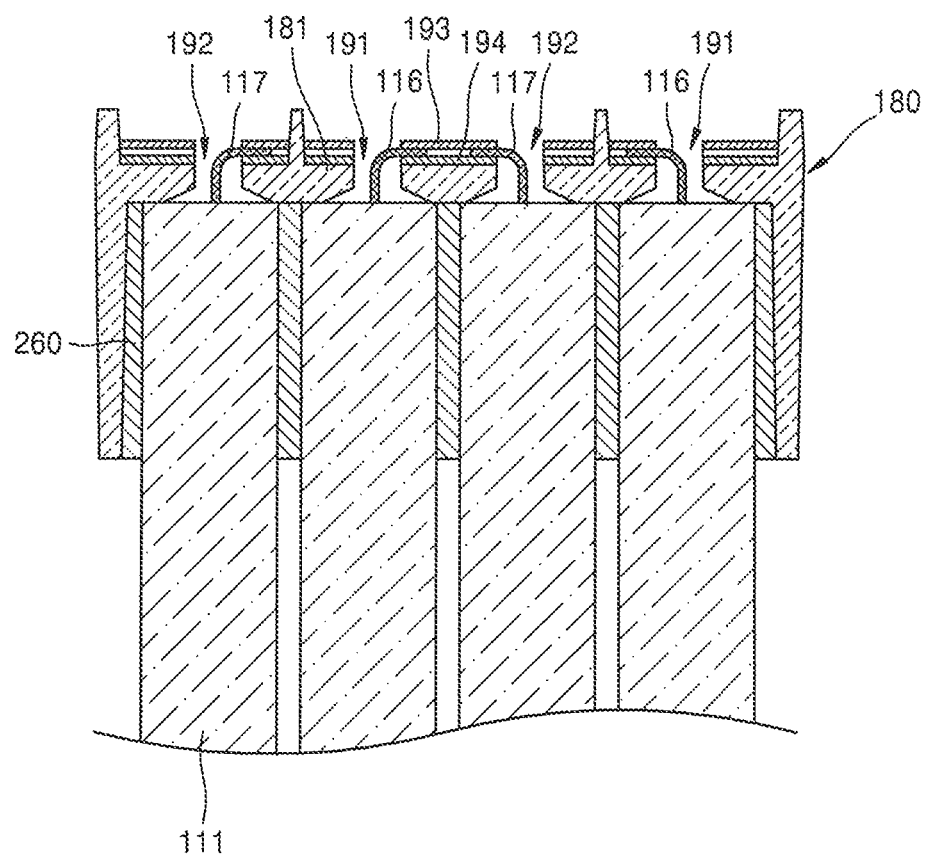
FIG. 6 is a cross-sectional view of the battery cell of FIG. 5, cut along a line VI-VI.

FIG. 1 is a perspective view of a battery pack 100 according to an embodiment; FIG. 2 is an exploded perspective view of the battery pack 100 of FIG. 1; FIG. 3 is a perspective view of a core pack 140 and an elastic body 300 of the battery pack 100 of FIG. 1; FIG. 4 is an exploded perspective view of the core pack 140 and the elastic body 300 of FIG. 3; FIG. 5 is a side view of a first side 115 of a battery cell 110 of FIG. 2; and FIG. 6 is a cross-sectional view of the battery cell 110 of FIG. 5, cut along a line VI-VI.

Referring to FIGS. 1 to 6, the battery pack 100 includes the core pack 140 and a case 170 accommodating the core pack 140 therein.

The core pack 140 includes the battery cell 110 and a plurality of electrode tabs 120 and 130. The battery cell 110 includes a plurality of unit battery cells 111. The unit battery cells 111 may be provided (e.g., sequentially provided) in a first direction (e.g., a y-direction). The unit battery cells 111 may be electrically connected to each other by a plurality of terminal plates 190. The unit battery cells 111 may be connected to each other in series or in parallel.

In an embodiment, the battery cell 110 includes a lithium ion battery. In an embodiment, the unit battery cells 111 may be pouch-type secondary battery cells having flexibility. In another embodiment, the unit battery cells 111 may be rectangular secondary battery cells or cylindrical secondary battery cells.

The battery cell 110 includes a top part 112, a bottom part 113 provided in a direction opposite to the top part 112 (e.g., a z-direction), and side parts 114 interconnecting the top and bottom parts 112 and 113. A cell holder 180 may be provided at the first side 115 of the battery cell 110 in a second direction (e.g., an x-direction) crossing the first direction (e.g., the y-direction), to cover the first side 115 of the battery cell 110. The cell holder 180 may cover the top, bottom, and side parts 112, 113, and 114 at the first side 115 of the battery cell 110. In an embodiment, the cell holder 180 is not limited to any particular structure as long as the structure supports the first side 115 of the battery cell 110.

The terminal plates 190 each having one or more tab holes 191 and 192, and a first cell tab 116 and a second cell tab 117 protruding from each of the unit battery cells 111 may be provided at the first side 115 of the battery cell 110. The first cell tab 116 may be a positive cell tab, and the second cell tab 117 may be a negative cell tab.

The first and second cell tabs 116 and 117 having opposite polarities and protruding from neighboring unit battery cells 111 may be respectively inserted and fixed into a first tab hole 191 and a second tab hole 192 provided in each of the terminal plates 190.

In an embodiment, the terminal plates 190 may be mounted on ribs 181 of the cell holder 180. The number of the terminal plates 190 may be determined based on the number of the unit battery cells 111. The first and second tab holes 191 and 192 may be provided in one terminal plate 190. The first cell tab 116 protruding from one unit battery cell 111 and the second cell tab 117 protruding from another neighboring unit battery cell 111 may be respectively inserted into the first and second tab holes 191 and 192 provided in one terminal plate 190. The inserted first and second cell tabs 116 and 117 may be bent in a direction and, at this time, may be laser-welded to the terminal plate 190.

In an embodiment, the terminal plate 190 includes an upper terminal plate 193 and a lower terminal plate 194. The first and second cell tabs 116 and 117 may be located between the upper and lower terminal plates 193 and 194, and may be electrically connected to the terminal plate 190, such as by laser welding. However, in one or more embodiments, the method of fixing the first and second cell tabs 116 and 117 to the terminal plate 190 is not limited to any particular method.

A first terminal plate 195 having the first tab hole 191 and a second terminal plate 196 having the second tab hole 192 may be provided at outermost parts of the battery cell 110. The first and second terminal plates 195 and 196 may be separately provided at two sides of the battery cell 110. The first cell tab 116 protruding from one unit battery cell 111 may be electrically connected through the first tab hole 191 to the first terminal plate 195, and the second cell tab 117 protruding from another unit battery cell 111 may be electrically connected through the second tab hole 192 to the second terminal plate 196.

The first and second terminal plates 195 and 196 may be respectively electrically connected to a first electrode tab 120 and a second electrode tab 130. The first and second electrode tabs 120 and 130 may be provided at the top part 112 of the battery cell 110. In an embodiment, the first and second terminal plates 195 and 196 may be bent from the first side 115 of the battery cell 110 to the top part 112 of the battery cell 110, and may be electrically connected to the first and second electrode tabs 120 and 130 at the top part 112 of the battery cell 110. The first electrode tab 120 may be a positive electrode tab, and the second electrode tab 130 may be a negative electrode tab. In an embodiment, the first electrode tab 120 and the first terminal plate 195 may be integrated with each other, and the second electrode tab 130 and the second terminal plate 196 may be integrated with each other.

In an embodiment, an adhesive member 260, e.g., an adhesive tape, may be provided between neighboring unit battery cells 111 to prevent or substantially prevent misalignment thereof.

The case 170 includes a lower case 150 accommodating the core pack 140 therein, and an upper case 160 coupled to the lower case 150. A gasket or O-ring 240 may be provided between the lower and upper cases 150 and 160, such as to increase a coupling force therebetween.

An opening 151 may be provided at a side (e.g., an upper side) of the lower case 150 to insert the core pack 140 therethrough. The upper case 160 may close the opening 151. A first terminal 200 and a second terminal 210 may be provided on the upper case 160.

The first terminal 200 may be electrically connected to the first electrode tab 120 by a first wire 220, and the second terminal 210 may be electrically connected to the second electrode tab 130 by a second wire 230. A first end 221 of the first wire 220 may be connected to the first electrode tab 120, and a second end 222 of the first wire 220 may be connected to the first terminal 200. A first end 231 of the second wire 230 may be connected to the second electrode tab 130, and a second end 232 of the second wire 230 may be connected to the second terminal 210. Insulation tape 250 may be wrapped around outer circumferential surfaces of the first and second wires 220 and 230.

An accident or an external impact may damage the core pack 140 of the battery pack 100. For example, when vibration of a certain strength or magnitude is applied to the battery pack 100, an exterior material of the unit battery cells 111 may be torn or the cell tabs 116 and 117 may be cut and, thus, the core pack 140 may not function appropriately.

In an embodiment, the elastic body 300 may be provided between the core pack 140 and the case 170 to protect the core pack 140.

The elastic body 300 may elastically support the exterior of the core pack 140. In an embodiment, the elastic body 300 may surround the side parts 114 of the battery cell 110. The elastic body 300 may protect the first side 115 of the battery cell 110 at which the first and second cell tabs 116 and 117 are connected (e.g., laser-welded) to the terminal plates 190. In an embodiment, the elastic body 300 may surround the entire side parts 114 of the battery bell 110.

The elastic body 300 may have a space accommodating the battery cell 110 therein. The elastic body 300 may have first surfaces 310 contacting the side parts 114 of the battery cell 110, and second surfaces 320 extending from or opposite to the first surfaces 310 in a thickness direction (e.g., the y-direction) and contacting internal side surfaces 152 of the lower case 150.

In an embodiment, the battery cell 110 may be tightly fitted into the elastic body 300. In another embodiment, the elastic body 300 may be extruded to surround the side parts 114 of the battery cell 110.

In an embodiment, the elastic body 300 may have a Shore hardness of 40 to 70 Hs. If the Shore hardness of the elastic body 300 is less than 40 Hs, the elastic body 300 may not appropriately function as a buffer. If the Shore hardness of the elastic body 300 is greater than 70 Hs, the elastic body 300 may not absorb external impact and the impact may be entirely delivered to the core pack 140.

In an embodiment, the elastic body 300 may be made of rubber or silicon having a Shore hardness in a range of 40 Hs, to 60 Hs. In an embodiment, the elastic body 300 is not limited to any one material as long as the material has a Shore hardness of 40 to 70 Hs.

The elastic body 300 may further include an extension part 330 provided between the bottom part 113 of the battery cell 110 and a bottom surface of the lower case 150. The extension part 330 may be bent and extended from a bottom part of the elastic body 300 surrounding the side parts 114 of the battery cell 110. In an embodiment, the elastic body 300 may be provided having a rectangular box shape having a space accommodating the battery cell 110 therein, but is not limited to any particular shape as long as the shape surrounds the side parts 114 of the battery cell 110.

At least one release hole 331 may be provided in the extension part 330 to release heat generated from the battery cell 110. In an embodiment, the release hole 331 may have a rectangular hole shape. However, the release hole 331 may have another shape other than the rectangular shape. In an embodiment, the release hole 331 may be provided in the part surrounding the side parts 114 of the battery cell 110 as well as the extension part 330.

When the battery cell 110 operates, the exterior material of the unit battery cells 111 may swell. In an embodiment, the elastic body 300 includes cut parts 340, or opening parts, to provide swelling spaces for the battery cell 110. In an embodiment, the cut parts 340 may be provided by cutting at least parts of the elastic body 300.

The cut parts 340 may correspond to regions where parts of the elastic body 300 are cut from a top edge 301 of the elastic body 300 corresponding to the top part 112 of the battery cell 110 toward a bottom edge 302 of the elastic body 300 corresponding to the bottom part 113 of the battery cell 110.

In an embodiment, each of the cut parts 340 may be a three-cut part. That is, in an embodiment, the cut part 340 may include a first cut part 341, or first opening part, and a second cut part 342, or second opening part, cut from the top edge 301 of the elastic body 300 toward the bottom edge 302 of the elastic body 300, and a third cut part 343, or third opening part, interconnecting the first and second cut parts 341 and 342. The first and second cut parts 341 and 342 may be spaced apart from each other by a distance (e.g., a certain distance).

In an embodiment, the cut parts 340 include rectangular spaces obtained by cutting parts of the elastic body 300 corresponding to central regions of the side parts 114 of the battery cell 110. However, the location and shape of the cut parts 340 may be changed or selected depending on regions where the battery cell 110 swells.

Since the elastic body 300 has a certain elastic force, the first surfaces 310 of the elastic body 300 may directly contact the side parts 114 of the battery cell 110, and the second surfaces 320 of the elastic body 300 may directly contact the internal side surfaces 152 of the lower case 150. In an embodiment, a plurality of grooves 350 may be provided in the elastic body 300 to reduce friction with the lower case 150.

The grooves 350 may be provided in the second surfaces 320 of the elastic body 300 contacting the internal side surfaces 152 of the lower case 150. The grooves 350 may have linear shapes extending from the top edge 301 of the elastic body 300 corresponding to the top part 112 of the battery cell 110 to the bottom edge 302 of the elastic body 300 corresponding to the bottom part 113 of the battery cell 110. The grooves 350 may be spaced apart from each other in the second direction (e.g., the x-direction) crossing the first direction (e.g., the y-direction).

The present applicant has conducted reliability tests of the battery pack 100. After a drop test from the height of 1 m, no damage was generated in the core pack 140. After vibration tests of 10 G and 15 G, no error was generated in the core pack 140.

According to an aspect, a battery pack according to one or more embodiments may safely protect a core pack from accidents or external impacts.

Further aspects and effects other than the above-described aspects and effects may be inferred based on the description herein with reference to the drawings.

It should be understood that the one or more embodiments described herein should be considered in a descriptive sense only and not for purposes of limitation. Descriptions of features or aspects within each embodiment should typically be considered as available for other similar features or aspects in other embodiments.

While one or more embodiments have been described with reference to the drawings, it will be understood by those of ordinary skill in the art that various changes in form and details may be made therein without departing from the spirit and scope as defined by the following claims.

What is claimed is:

1. A battery pack comprising:
   a core pack comprising a battery cell including a plurality of unit battery cells electrically connected to each other, a first electrode tab, and a second electrode tab;
   a case comprising a lower case accommodating the core pack therein and having an opening at a side thereof to insert the core pack therethrough, and an upper case closing the opening and including a first terminal and a second terminal electrically connected to the first electrode tab and the second electrode tab, respectively; and
   an elastic body between the core pack and the case to elastically support an exterior of the core pack,
   wherein the unit battery cells are sequentially arranged in a first direction,
   wherein the battery cell comprises a top part, a bottom part in a direction opposite to the top part, and side parts interconnecting the top and bottom parts, the first and second electrode tabs being arranged on the top part,
   wherein the elastic body surrounds the side parts of the battery cell, and
   wherein each of the unit battery cells comprises a first cell tab and a second cell tab protruding therefrom at a first side of the battery cell corresponding to one of the side parts.

2. The battery pack of claim 1, wherein the elastic body has a space accommodating the battery cell therein and comprises first surfaces contacting the side parts of the battery cell, and second surfaces opposite to the first surfaces in a thickness direction and contacting internal side surfaces of the lower case.

3. The battery pack of claim 2, wherein the elastic body has opening parts to provide swelling spaces for the battery cell.

4. The battery pack of claim 2, wherein the elastic body further comprises an extension part provided between the bottom part of the battery cell and a bottom surface of the lower case, and bent and extended from a bottom part of the elastic body surrounding the side parts of the battery cell.

5. The battery pack of claim 2, wherein a plurality of grooves are provided in the second surfaces to reduce friction with the lower case.

6. The battery pack of claim 1, wherein a cell holder is provided at a first side of the battery cell in a second direction crossing the first direction, to cover the first side of the battery cell.

7. The battery pack of claim 1,
   wherein a plurality of terminal plates each having one or more tab holes is provided at the first side of the battery cell, and
   wherein the first and second cell tabs having opposite polarities and protruding from neighboring unit battery cells are respectively inserted and fixed into a first tab hole and a second tab hole of the one or more tab holes of a terminal plate of the plurality of terminal plates.

8. The battery pack of claim 7,
   wherein a first terminal plate of the plurality of terminal plates having a first tab hole of the one or more tab holes and a second terminal plate of the plurality of terminal plates having a second tab hole of the one or more tab holes are separately provided at outermost parts of the battery cell,
   wherein the first cell tab protruding from a unit battery cell of the unit battery cells is connected through the first tab hole to the first terminal plate,
   wherein the second cell tab protruding from another unit battery cell of the unit battery cells is connected through the second tab hole to the second terminal plate, and
   wherein the first and second terminal plates are respectively electrically connected to the first and second electrode tabs at the top part of the battery cell.

9. The battery pack of claim 8,
   wherein the first electrode tab is electrically connected to the first terminal through a first wire, and
   wherein the second electrode tab is electrically connected to the second terminal through a second wire.

10. A battery pack comprising:
    a core pack comprising a battery cell including a plurality of unit battery cells electrically connected to each other, a first electrode tab, and a second electrode tab;
    a case comprising a lower case accommodating the core pack therein and having an opening at a side thereof to insert the core pack therethrough, and an upper case closing the opening and including a first terminal and a second terminal electrically connected to the first electrode tab and the second electrode tab, respectively; and
    an elastic body between the core pack and the case to elastically support an exterior of the core pack,
    wherein the unit battery cells are sequentially arranged in a first direction,
    wherein the battery cell comprises a top part, a bottom part in a direction opposite to the top part, and side parts interconnecting the top and bottom parts, the first and second electrode tabs being arranged on the top part,
    wherein the elastic body surrounds the side parts of the battery cell,
    wherein the elastic body has a space accommodating the battery cell therein and comprises first surfaces contacting the side parts of the battery cell, and second surfaces opposite to the first surfaces in a thickness direction and contacting internal side surfaces of the lower case,
    wherein the elastic body has opening parts to provide swelling spaces for the battery cell, and
    wherein the opening parts correspond to regions where parts of the elastic body are open from a top edge of the elastic body corresponding to the top part of the battery cell toward a bottom edge of the elastic body corresponding to the bottom part of the battery cell.

11. The battery pack of claim 10, wherein each of the opening parts comprises a first opening part and a second opening part extending from the top edge of the elastic body toward the bottom edge of the elastic body and spaced apart from each other, and a third opening part interconnecting the first and second opening parts.

12. A battery pack comprising:
   a core pack comprising a battery cell including a plurality of unit battery cells electrically connected to each other, a first electrode tab, and a second electrode tab;
   a case comprising a lower case accommodating the core pack therein and having an opening at a side thereof to insert the core pack therethrough, and an upper case closing the opening and including a first terminal and a second terminal electrically connected to the first electrode tab and the second electrode tab, respectively; and
   an elastic body between the core pack and the case to elastically support an exterior of the core pack,
   wherein the unit battery cells are sequentially arranged in a first direction,
   wherein the battery cell comprises a top part, a bottom part in a direction opposite to the top part, and side parts interconnecting the top and bottom parts, the first and second electrode tabs being arranged on the top part,
   wherein the elastic body surrounds the side parts of the battery cell,
   wherein the elastic body has a space accommodating the battery cell therein and comprises first surfaces contacting the side parts of the battery cell, and second surfaces opposite to the first surfaces in a thickness direction and contacting internal side surfaces of the lower case,
   wherein the elastic body further comprises an extension part provided between the bottom part of the battery cell and a bottom surface of the lower case, and bent and extended from a bottom part of the elastic body surrounding the side parts of the battery cell, and
   wherein at least one release hole is provided in the extension part to release heat generated from the battery cell.

13. A battery pack comprising:
   a core pack comprising a battery cell including a plurality of unit battery cells electrically connected to each other, a first electrode tab, and a second electrode tab;
   a case comprising a lower case accommodating the core pack therein and having an opening at a side thereof to insert the core pack therethrough, and an upper case closing the opening and including a first terminal and a second terminal electrically connected to the first electrode tab and the second electrode tab, respectively; and
   an elastic body between the core pack and the case to elastically support an exterior of the core pack,
   wherein the unit battery cells are sequentially arranged in a first direction,
   wherein the battery cell comprises a top part, a bottom part in a direction opposite to the top part, and side parts interconnecting the top and bottom parts, the first and second electrode tabs being arranged on the top part,
   wherein the elastic body surrounds the side parts of the battery cell,
   wherein the elastic body has a space accommodating the battery cell therein and comprises first surfaces contacting the side parts of the battery cell, and second surfaces opposite to the first surfaces in a thickness direction and contacting internal side surfaces of the lower case,
   wherein a plurality of grooves are provided in the second surfaces to reduce friction with the lower case, and
   wherein the grooves have linear shapes extending from a top edge of the elastic body corresponding to the top part of the battery cell to a bottom edge of the elastic body corresponding to the bottom part of the battery cell, and are spaced apart from each other in a second direction crossing the first direction.

* * * * *